United States Patent
Prasad et al.

(10) Patent No.: US 12,518,812 B2
(45) Date of Patent: Jan. 6, 2026

(54) FERROELECTRIC RANDOM-ACCESS MEMORY WITH ENHANCED LIFETIME, DENSITY, AND PERFORMANCE

(71) Applicant: Advanced Micro Devices, Inc., Santa Clara, CA (US)

(72) Inventors: Divya Madapusi Srinivas Prasad, Mountain View, CA (US); Michael Ignatowski, Austin, TX (US); Niti Madan, Bee Cave, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 151 days.

(21) Appl. No.: 18/216,501

(22) Filed: Jun. 29, 2023

(65) Prior Publication Data

US 2024/0087632 A1     Mar. 14, 2024

Related U.S. Application Data

(60) Provisional application No. 63/405,338, filed on Sep. 9, 2022.

(51) Int. Cl.
*G11C 11/22*     (2006.01)

(52) U.S. Cl.
CPC ...... *G11C 11/2273* (2013.01); *G11C 11/2255* (2013.01); *G11C 11/2257* (2013.01); *G11C 11/2275* (2013.01)

(58) Field of Classification Search
CPC .............. G11C 11/2273; G11C 1/2255; G11C 11/2257; G11C 11/2275; G11C 11/2255
See application file for complete search history.

(56) References Cited

U.S. PATENT DOCUMENTS

| | | | |
|---|---|---|---|
| 11,423,967 B1 * | 8/2022 | Dokania | H10B 53/30 |
| 2020/0051607 A1 * | 2/2020 | Pan | G11C 11/2257 |
| 2023/0132574 A1 * | 5/2023 | Zhao | H10B 12/482 |
| | | | 257/296 |
| 2023/0284456 A1 * | 9/2023 | Dokania | H01L 25/0652 |
| | | | 257/5 |
| 2025/0048646 A1 * | 2/2025 | Zhang | H10B 51/20 |

* cited by examiner

*Primary Examiner* — Han Yang
(74) *Attorney, Agent, or Firm* — Patterson + Sheridan, LLP (57) ABSTRACT

A memory device includes memory cells. A memory cell of the memory cells includes gate circuitry, a first capacitor, and a second capacitor. The gate circuitry is connected to a wordline and a bitline. The first capacitor is connected to the gate circuitry and a first drive line. The second capacitor is connected to the gate circuitry and a second drive line.

19 Claims, 6 Drawing Sheets

FERROELECTRIC RANDOM-ACCESS MEMORY WITH ENHANCED LIFETIME, DENSITY, AND PERFORMANCE

CROSS REFERENCE TO RELATED APPLICATION

This application claims priority to the U.S. Provisional Patent Application No. 63/405,338, filed on Sep. 9, 2022 of which is incorporated herein by reference in its entirety.

TECHNICAL FIELD

Examples of the present disclosure generally relate to a ferroelectric random-access memory having an improved capacitor design that provide improved memory density, endurance, performance, and power efficiency.

BACKGROUND

Non-volatile memories such as ferroelectric based memories (e.g., ferroelectric random-access memories (FeRAMs) or ferroelectric field-effect transistor (FeFET) memories, among others), magnetoresistive RAMs (MRAMs), and volatile memories such as dynamic random access memories (DRAMs), including high bandwidth memory (HBM) and other stacked variants of DRAM, provide higher memory density, performance, and lower power than other types of memories.

DRAMs are a commonly used off-chip memory. However, DRAM has Performance-Power-Area (PPA) limitations relating to accessing data with an external integrated circuit (IC) chip (e.g., off-chip). The typical DRAM bitcell consists of a one transistor and one capacitor (1T-1C) structure, where the capacitor is formed by a dielectric layer sandwiched in between conductor plates. System Instruction-per-cycle (IPC) and/or system performance is often limited by DRAM bandwidth and latency, especially in memory-heavy workloads.

HBM has been introduced to provide increased bandwidth and memory density, allowing up to 8-12 layers of DRAM dies to be stacked on top of each other with an optional logic/memory interface die.

A FeRAM memory bitcell is similar to the 1T-1C structure DRAM, except for the capacitor that is made of a ferroelectric material versus a (linear) dielectric in the DRAM case. Bit '0' and '1' are written with electric polarization orientations of the ferroelectric material in the dielectric. The benefit of this technology is a refresh-free storage that increases the density and performance as compared to a DRAM. MRAM bitcell has a 1T-1R (one transistor, one resistor) configuration that does not have a destructive read, unlike DRAM and FeRAM. However, MRAM is less reliable as compared to FeRAM, and other ferroelectric based memories, and has lower endurance and retention.

A memory technology may be developed using as an independent macro or for specific applications like deep neural networks (DNN), in the HBM case. In some examples, graphics processing DDR (GPDDR) is used to support high-bandwidth memory for graphics applications. More fine-grained optimizations of memory technology with logic technology and architecture are not deeply explored, accordingly, further work is to be done to achieve superior performance and lower power products. Non-linear power increase and/or decreasing improvement in performance and memory density from generation to generation uses more design and co-optimization to alleviate memory bottlenecks.

SUMMARY

In the following, ferroelectric based memories having ferroelectric random-access memory (FeRAMs) or ferroelectric field-effect transistor (FeFET) memory structures, among others, are described. The use of FeRAM and FeFET memory structures, with appropriate support circuitry, provide enhanced endurance, performance, power efficiency, and memory density (e.g., multi-bit storage), as compared to other memory structures.

In one example, a memory cell includes gate circuitry, a first capacitor, and a second capacitor. The gate circuitry is connected to a wordline and a bitline. The first capacitor is connected to the gate circuitry and a first drive line. The second capacitor is connected to the gate circuitry and a second drive line.

In one example, a memory device includes a plurality of wordlines, a plurality of bitlines, a plurality of drive lines, and a plurality of memory cells. A first memory cell of the plurality of memory cells includes gate circuitry, a first capacitor, and a second capacitor. The gate circuitry is connected to a first wordline of the wordlines and a first bitline of the bitlines. The first capacitor is connected to the gate circuitry and a first drive line of the plurality of drive lines. The second capacitor is connected to the gate circuitry and a second drive line of the plurality of drive lines.

In one example, a method includes asserting a wordline associated with a selected memory cell. The selected memory cell includes gate circuitry, a first capacitor, and a second capacitor. The gate circuitry is connected to the wordline and a bitline. The first capacitor is connected to the gate circuitry and a first drive line. The second capacitor is connected to the gate circuitry and a second drive line. The method further comprises selecting the bitline, and driving the first drive line to perform a memory operation on the first capacitor.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

A memory device includes one or more memory cells (e.g., bitcells) that store bit values. The memory cells are connected to wordlines and bitlines of the memory device. Each memory cell is connected to one or more wordlines and one or more bitlines. The wordlines are driven to select one or more memory cells (e.g., a row of memory cells) to be written to or read. The bitlines are driven to write a value to a selected memory cell (or memory cells) or electrically floated to read a value from a selected memory cell (or memory cells). A memory cell includes one or more transistors and one or more capacitors. The transistors are coupled to the wordlines and bitlines to control selecting, writing to, and reading from the memory cells. The one or more capacitors store the value of the memory cell. Writing to a memory cell updates the value of the one or more capacitors. Reading from a memory cells reads a value from the one or more capacitors. In one example, a memory read operation is a destructive operation that erases the data that is read from the corresponding capacitor. In such an example, after reading the data, the data may be written back to the memory cell.

Memory devices may be "off-chip" memory devices. An off-chip memory device differs from an embedded memory device in that an off-chip is disposed in a different chip (e.g., integrated circuit (IC) die) than the chip of the processor (e.g., processor IC die). An off-chip memory device is typically has a larger storage size than an embedded memory device. However, an off-chip memory device has an increased latency as compared to embedded memory, increasing memory read and write times and decreasing processor performance.

Figure 1:
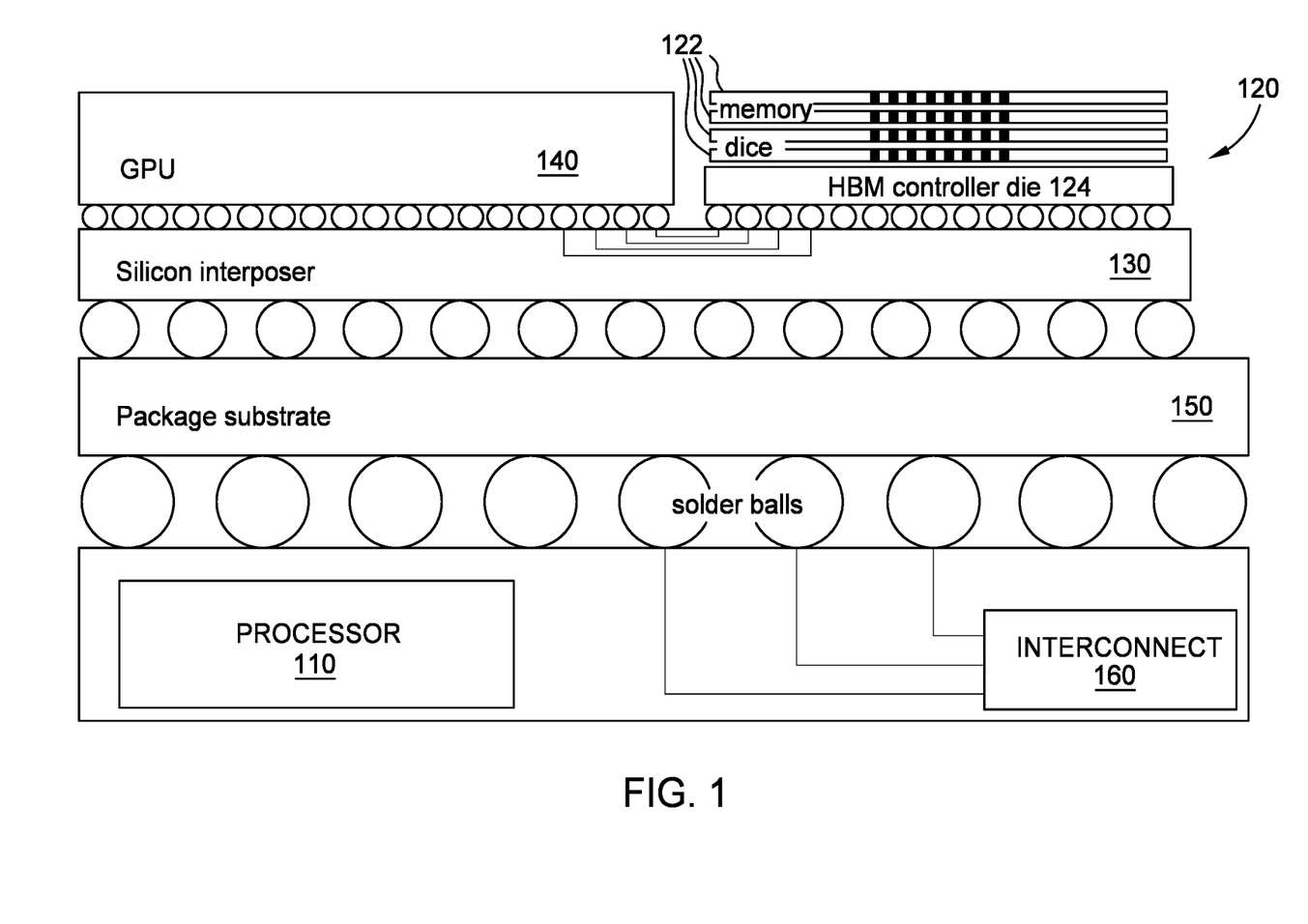
FIG. 1 illustrates a block diagram of a memory system.

A dynamic random access memory (DRAM) is a commonly used off-chip memory. However, DRAM has Performance-Power-Area (PPA) limitations that are related to accessing data in an off-chip memory. The typical DRAM bitcell consists of a one transistor and one capacitor (1T-1C) structure, where the capacitor is formed by a dielectric layer sandwiched in between conductor plates. High bandwidth memory (HBM) provides increased bandwidth and memory density by allowing up to 8-12 layers of DRAM (or other memory devices) dies (chips) to be stacked on top of each other with an optional logic/memory interface die. As illustrated in FIG. 1, the memory stack 120 is either be connected to the processor 140 through the silicon interposer 130 or disposed on top of the processor 110 to provide superior connectivity and performance. In one example, the memory stack 120 is connected to the processor 110 and the interconnects 150 via the silicon interposer 130 and package substrate 160. The processors may be a central processing unit (CPU) or a graphics processing unit (GPU), among others. The memory stack 120 may include a memory controller die 124 and one or more memory dies 122. The memory dies 122 are interconnected and stacked on and connected to the memory controller die 124.

A non-volatile memories such as ferroelectric based memories (e.g., ferroelectric RAMs (FeRAMs) or ferroelectric field-effect transistor (FeFET) memories, among others), magnetoresistive RAMs (MRAMs), provide higher memory density, performance, and lower power than other types of memory devices. A Fe RAM memory bitcell is similar to a 1T-1C structure DRAM, except for the capacitor that is made of a ferroelectric material versus a (linear) dielectric in the DRAM case. In a FeRAM memory, Bit '0' and '1' are written with electric polarization orientations of the ferroelectric material in the dielectric. A FeRAM provides refresh-free storage and an increase density and performance as compared to a DRAM. Like DRAM, a read operation with a FeRAM is a destructive operation.

A bitcell of an MRAM has a 1T-1R (one transistor, one resistor) configuration. Unlike FeRAM and DRAM, a MRAM does not have a destructive read operation. However, MRAM is less reliable as compared to Fe RAM, and other ferroelectric based memories, and has lower endurance and retention.

A non-volatile memory (NVM) like ferroelectric based memory (e.g., FeRAM and FeFET memory, among others) is logic compatible with processor IC devices, and has several advantages over other NVM technologies, like improved endurance compared to magnetoresistive RAM (MRAM), lower power compared to NAND flash, and higher latency. Compared to DRAM, ferroelectric based memory does not use refresh, and ferroelectric based memory is radiation hardened (rad-hard) since the data is not stored as charge. In the following, ferroelectric based memory technology and circuitry is described that mitigates the effects of destructive reads to improve latency without compromising read integrity. The memory structures described herein include more than one capacitor per memory cell, reducing the amount of write-back operations that occur when a destructive read occurs. For example, the same value is loaded into multiple capacitors of a memory cell. Accordingly, when the memory cell is read with a destructive read, the destructive read only erases the value in the capacitor that is read. The other capacitors are able be read at a later time. A write-back procedure occurs when the last capacitor in a memory cell is read, not after each memory read operation occurs, reducing the number of write-back procedures that occur. Further, multi-bit storage within a single ferroelectric based memory cell is described within a multi-capacitor bitcell. The embodiments described herein provide improved memory performance and error recovery. Further, one or more embodiments provide multiple bit storage and/or independent access using FeRAM. In one or more examples, parts of the data within a ferroelectric based memory cell are accessed independently. In other embodiments, existing ferroelectric based memory circuits which are lower performant are used, providing lower error tolerance and single bit storage.

Figure 2:
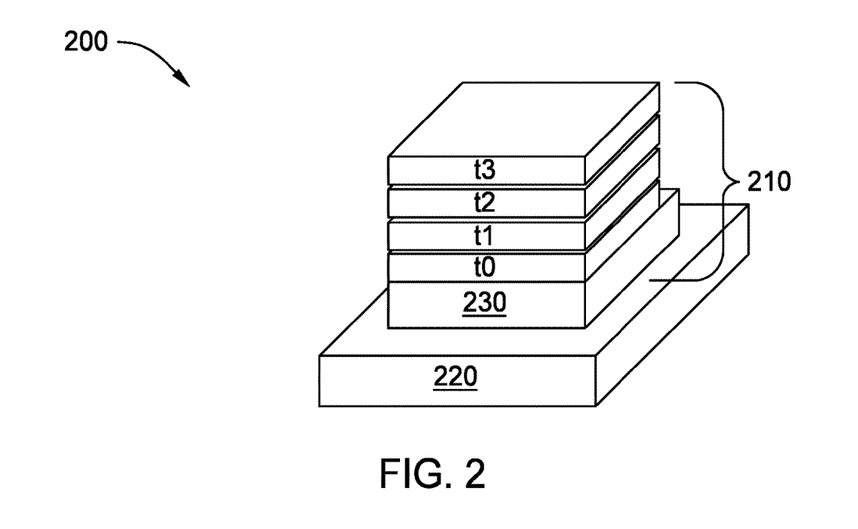
FIG. 2 illustrates a block diagram of a memory system.

FIG. 2 illustrates an example of IC system 200 with a DRAM/HBM stack 210 stacked on top of a processor IC chip 220. The processor IC chip 220 is central processing unit (CPU) graphic processing unit (GPU), or a field programmable gate array (FPGA), among others, with a memory-interface die. The example of FIG. 2 includes a DRAM stack 210 stacked on top of the processor IC chip 220 with a memory-interface/controller die 230. The DRAM stack 210 can include one or more DRAM chips. The DRAM chips t0-t3 of the DRAM stack 210 are connected via through silicon-vias (TSVs) and/or hybrid bonds, among others.

Figure 3:
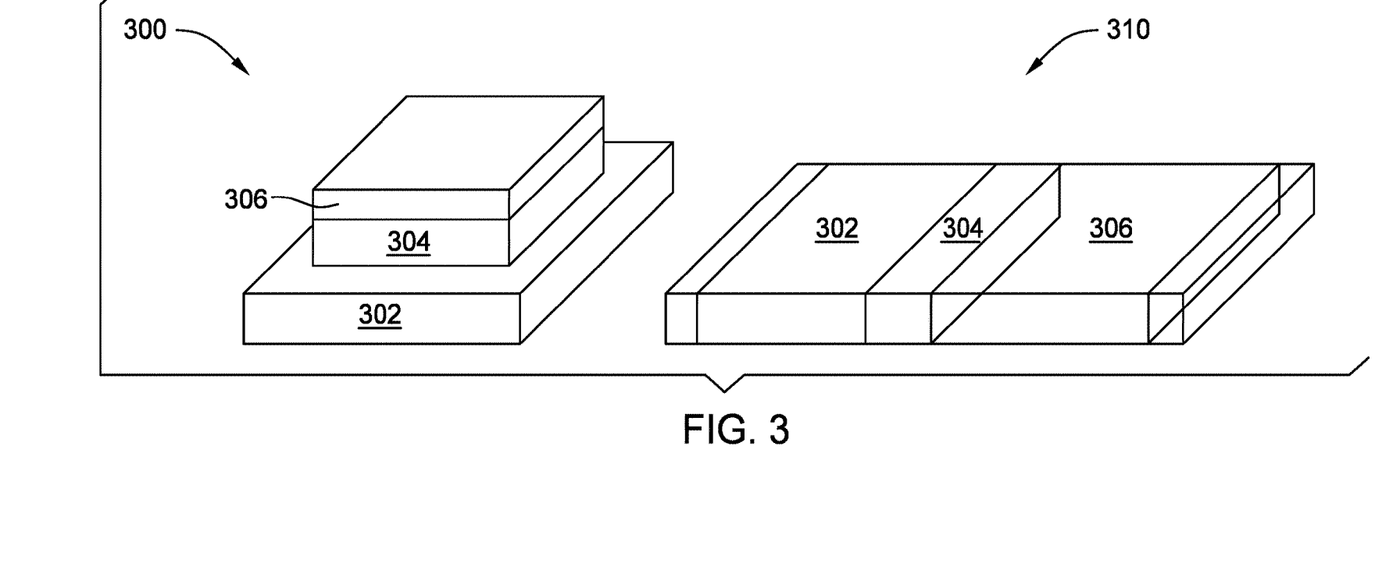
FIG. 3 illustrates a block diagram of different memory systems.

FIG. 3 illustrates an IC system 300 with a ferroelectric based memory (e.g., FeRAM and FeFET memory, among others) 306 and memory controller are stacked on-top of the processor IC chip 302. In the IC system 310, the ferroelectric based memory 306 and controller 304 are disposed on the same die as the processor IC chip 302. In the IC system 300, a ferroelectric based memory 306 is stacked on top of the processor IC chip 302 with a memory-interface. In the IC system 310, the ferroelectric based memory 306 is included in the same die as the processor IC chip 302 in the same die as the ferroelectric based memory is logic-technology compatible with the processor IC chip 302.

Figures 4A, 4B:
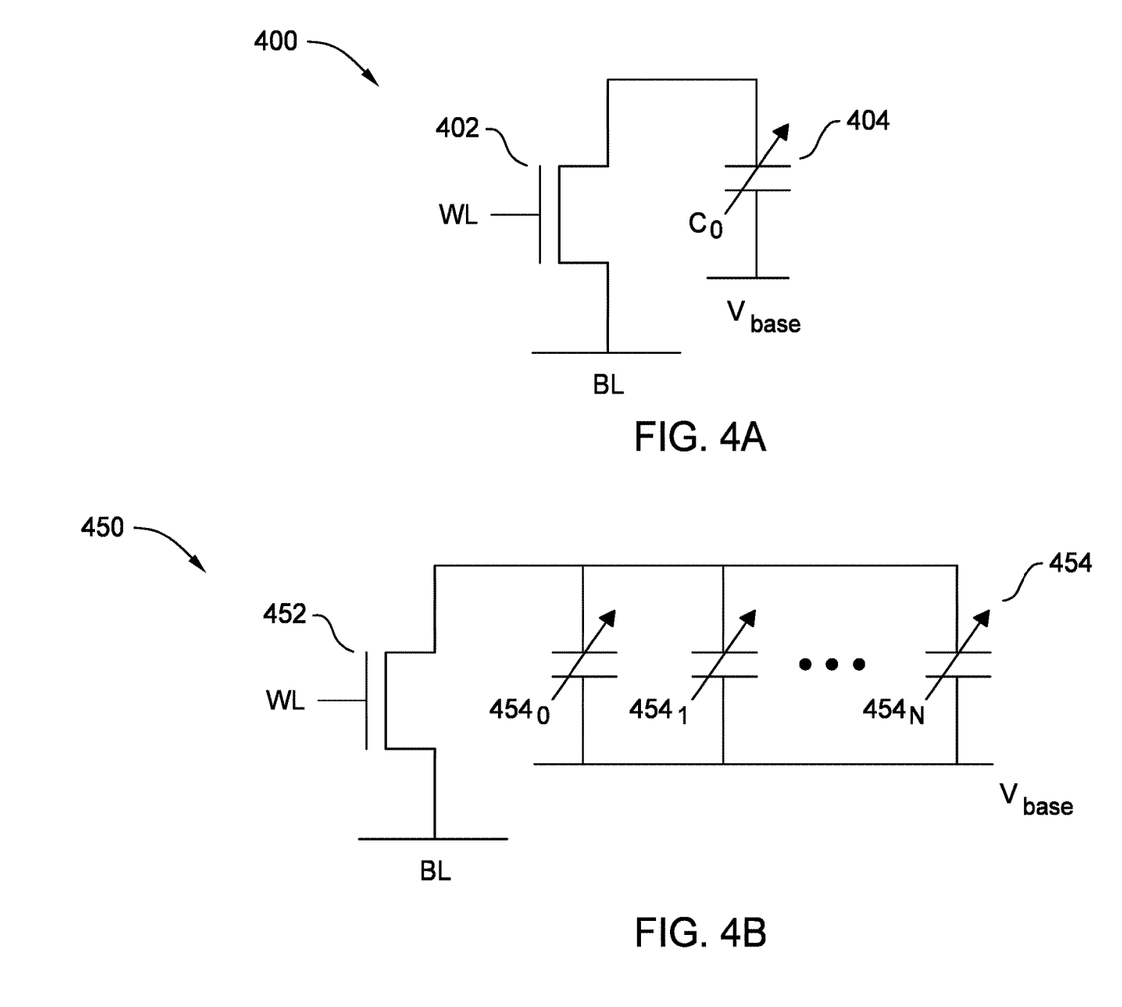
FIG. 4A illustrates a circuit diagram of a memory cell.
FIG. 4B illustrates a circuit diagram of a memory cell.

FIG. 4A illustrates a ferroelectric based memory (e.g., an FeRAM) memory cell 400, with one transistor (e.g., transistor 402) and one capacitor (e.g., capacitor 404), also referred to as a 1T-1C structure. FIG. 4B illustrates ferroelectric based memory cell 450 (e.g., an FeRAM), with one transistor (e.g., transistor 452) and N capacitors (e.g., capacitors 454), also referred to as a 1T-NC structure, where N being one or more. In the example of FIG. 4B, the storage capacitors 454 consists of a discrete number of capacitors (e.g., capacitors $450_0$-$454_N$). In the memory cell 400 and the memory cell 450, the capacitors 404 and 454 are ferroelectric capacitors. Further, in one or more examples, the transistor 402 of the memory cell 400 and the transistor 452 of memory cell 450 may be referred to as gate circuitry. In another example, the transistor 412 and 452 may be replaced with transmission gate circuitry that includes two transistors (or more transistors) positioned in parallel with each other. The transmission gate circuitry may be referred to as gate circuitry. Further, in a transmission gate circuitry that includes two transistors, a first transistor has a gate connected a wordline, and a second transistor has a gate terminal connected to a negated wordline.

In the memory cell 400, the capacitor 404 is connected between the transistor 402 and the Vbase node (e.g., a drive line used for read operation). In the memory cell 450, the capacitors 454 are connected between the transistor 452 and the Vbase node. Further, the gate of the transistors 402 and 452 are connected to a wordline (WL), and the source (or drain) of the transistor is connected to a bitline (BL).

In one example, the memory cell 400 and 450 are FeRAM structures. In such an example, the capacitors (e.g., the capacitor 414 or the capacitors 454) are attached to the source and/or drain terminals of the transistors (e.g., the transistor 412 or the transistor 452).

In one or more examples, the memory cells 400 and 450 are ferroelectric memories that include a FeFET memory structure. For example, the transistors 402 and 452 are FeFETs. In one example, the memory cells 400 and 450 are formed from a FeFET 3-terminal memory device. In such an example, in a FeFET memory structure, the capacitor(s) (e.g., the capacitor 414 or the capacitors 454) is stacked on top of the gate of the FeFET (e.g., the transistors 412 and 452). In DRAM examples, the storage capacitors are tied to a ground voltage.

In one example, during a write process, the Vbase node is driven with a logic value of 0, and the WL is asserted. During a write process, a voltage to be written is driven on BL. Further, during a read process, Vbase node is driven with a logic value of 1, WL is asserted. During a read process, BL is electrically floated. Depending on the stored data (polarization in the ferroelectric material), a voltage is generated, or no voltage is generated on the BL.

Figure 5A:
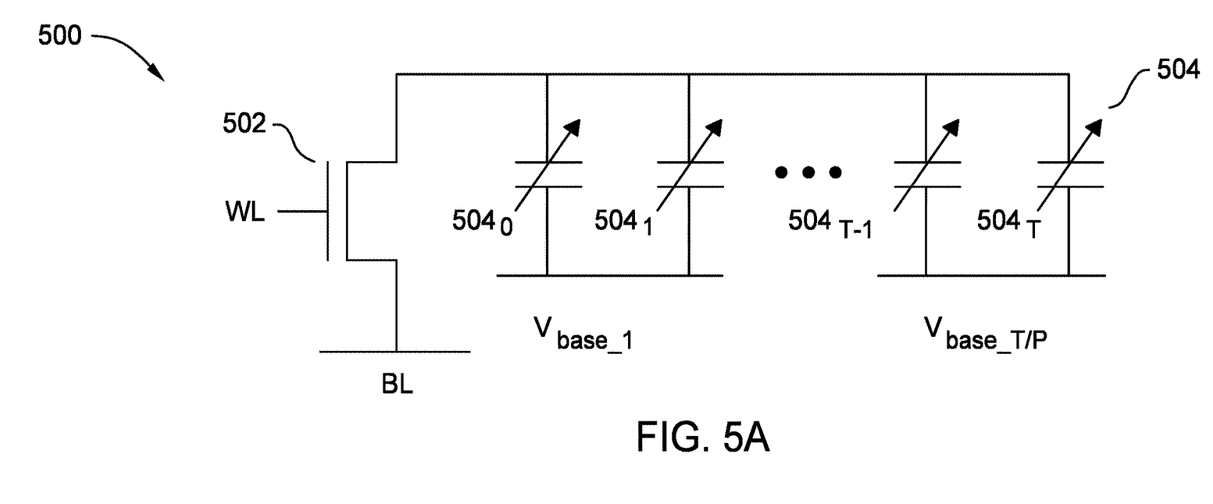
FIG. 5A illustrates a circuit diagram of a memory cell having selectable capacitor groups.

The memory cell 500 includes the transistor 502 and the capacitors 504. The capacitors 504 are connected between the transistor 502 and the Vbase node (e.g., $V_{base\_1}$ or $V_{base\_T/P}$). In one example, the capacitors 504 are connected to the source or drain of the transistor 502. The gate of the transistor is connected to WL. The drain of the source of the transistor 502 is connected to BL. The capacitors 504 include capacitors $504_0$-$504_T$. T is greater than 1. The capacitors 504 are connected to the $V_{base\_1}$ node or $V_{base\_T/P}$ node in groups of two or more. P is two or more. Further, T/2 is the number of bits of the multi-bit memory cell 500. As compared to the memory cell 450 of FIG. 4, in the memory cell 500 at least two capacitors 504 are connected to a different $V_{base}$ node.

In one example, a first plate of each of two or more of the capacitors 504 (e.g., the capacitors $504_0$ and $504_1$) is connected to the $V_{base\_1}$ node or the $V_{base\_T/P}$ node and a second plate of each of the two or more of the capacitors 504 (e.g., the capacitors 5040 and 5041) is connected to the transistor 502 (e.g., to a source or drain node of the transistor 502)

In one example, during a write process, the $V_{base\_1}$ node is driven with a logic value of 0, and the WL is asserted. The capacitors $504_0$ and $504_1$ are written with a voltage driven on the BL. Further, during a read process, the $V_{base\_1}$ node is driven with a logic value of 1, and the WL is asserted (e.g., driven with a logic value of 1). The value on the capacitors $504_0$ and $504_1$ is read out via the BL (which is electrically floated). Depending on the stored data (polarization in the ferroelectric material), a voltage is generated, or no voltage is generated on the BL. In one example, when performing a read or write operation on the capacitors $504_0$ and $504_1$, the $V_{base\_T/P}$ node is driven with a bias voltage or electrically floated. In another example, during a write process, the $V_{base\_T/P}$ node is driven with a logic value of 0, and the WL is asserted (e.g., driven with a logic value of 1). The capacitors $504_{T-1}$ and $504_T$ are written with a voltage driven on the BL. Further, during a read process, the $V_{base\_T/P}$ node is driven with a logic value of 1, and the WL is asserted (e.g., driven with a logic value of 1). The value on the capacitors $504_{T-1}$ and $504_T$ is read out via the BL. In one example, when performing a read or write operation on the capacitors $504_{T-1}$ and $504_T$, the $V_{base\_1}$ node is driven with a bias voltage or electrically floated.

Figure 5B:
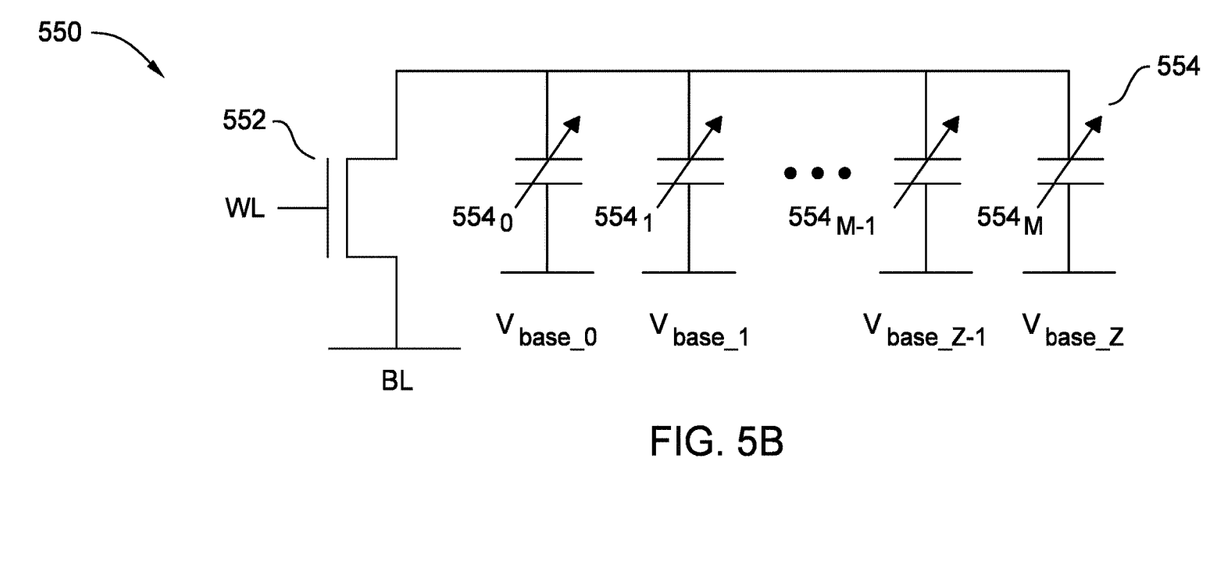
FIG. 5B illustrates a circuit diagram of a memory cell having selectable capacitors.

The memory cell 550 includes the transistor 552 and the capacitors 554. The capacitors 554 are connected between the transistor 552 and a respective $V_{base}$ node (e.g., $V_{base\_1}$-$V_{base\_n+1}$). In one example, the capacitors 554 are connected to the source or drain of the transistor 552. The gate of the transistor 552 is connected to WL. The drain of the source of the transistor 552 is connected to BL. The capacitors 554 include capacitors $554_0$-$554_M$. M is greater than 1. Each of the capacitors 554 is connected to one of the nodes $V_{base\_0}$-$V_{base\_Z}$. Z is greater than 1. In one example, M is equal to Z. In another example, M is greater than, equal to, or less than Z.

A first plate of each of the capacitors 554 is connected to a respective one of the $V_{base}$ nodes (e.g., $V_{base\_0}$-$V_{base\_Z}$ nodes), and a second plate of each of the capacitors 554 is connected to the transistor 552 (e.g., the source or drain of the transistor 552). The gate of the transistor is connected to a WL, and the drain or the source of the transistor 552 is connected to a BL.

Writing and reading from the capacitors 554 is controlled via the respective $V_{base}$ node. For example to perform a read process, one of the $V_{base}$ nodes (e.g., $V_{base\_0}$ node) is driven with a logic value of 0, and the other $V_{base}$ nodes (e.g., $V_{base\_1}$-$V_{base\_Z}$ nodes) are electrically floated or driven with a biasing voltage. Accordingly, a value of the capacitor $554_0$ is read via the BL, and the values of the capacitors $554_1$-$554_M$ are not read. Further, to perform a write process, one of the $V_{base}$ nodes (e.g., $V_{base\_0}$ node) is driven with a logic value of 1, and the other $V_{base}$ nodes (e.g., $V_{base\_1}$-$V_{base\_Z}$ nodes) are electrically floated or driven with a biasing voltage. Accordingly, a value of the capacitor $554_0$ is written (e.g., updated) via the BL, and the values of the capacitors $554_1$-$554_M$ are not updated.

In one example, to write a value to the capacitor $554_1$, the $V_{base\_1}$ node is driven with a logic value of 0, the $V_{base\_0}$ and $V_{base\_Z-1}$-$V_{base\_Z}$ nodes are electrically floated or driven with a biasing voltage, and the WL is asserted (e.g., driven with a logic value of 1). The capacitor $554_1$ is written with a voltage driven on the BL, and the values on the other capacitors (e.g., the capacitors $554_0$ and $554_{M-1}$-$554_M$) are unaffected. Further, to read a value from the capacitor $554_{M-1}$, the $V_{base\_m-1}$ node is driven with a logic value of 1, the $V_{base\_0}$, $V_{base\_1}$, and $V_{base\_Z}$ nodes are electrically floated or driven with a biasing voltage, and the WL is asserted (e.g., driven with a logic value of 1). The value on the capacitor $554_{M-1}$ is read out via the BL. Depending on the stored data (polarization in the ferroelectric material), a voltage is generated, or no voltage is generated on the BL.

In the memory cell 500 and the memory cell 550, multiple bits are stored or duplicate data is stored in a single memory cell within the capacitors 504 and/or the capacitors 554. In the example of FIG. 5A, T is the number of capacitors 504 (e.g., ferroelectric capacitors) that are grouped (e.g., connected) into two or more groups via the nodes $V_{base\_1}$ and $V_{base\_T/P}$. T/P is the number of bits within the multi-bit cell.

FIG. 5B illustrates an example where each capacitor 554 is connected to a different $V_{base}$ node. In the example of FIG. 5B, the number of bits within the multi-bit cell is M+1 for capacitors $554_0$-$554_M$.

In one or more examples, the increased number of $V_{base}$ nodes (and corresponding drive lines), increases the area used for metal routing. Increasing the amount of data stored within a memory cell, increases overhead due to the additional area used to route more data lines (e.g., $V_{base}$ nodes). In an example where the capacitors and circuit biasing between the memory cells of FIGS. 5A and 5B are the same, the memory cell 550 of FIG. 5B uses more area as compared to the memory cell 500 of FIG. 5A.

The capacitors 504 and 554 are discrete ferroelectric capacitors. In one example, the capacitors 504 and 554 are formed within the back end of line (BEOL) stack within a corresponding IC chip (e.g., IC chip including the corresponding memory device). Using the BEOL to form the capacitors reduces the area, as the use of the BEOL reduces the additional area footprint to the additional routing used for drive lines (e.g., drive lines connected to $V_{base}$ nodes).

Figure 6:
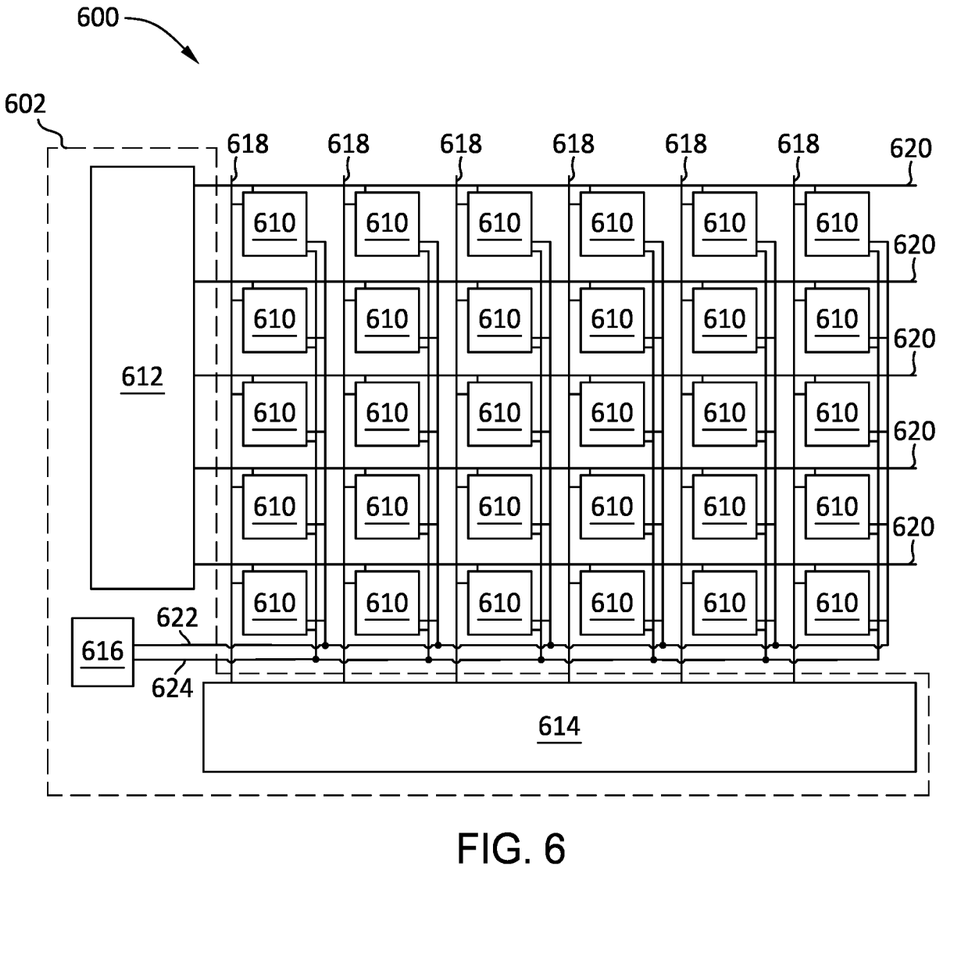
FIG. 6 illustrates a block diagram of a memory device.

FIG. 6 illustrates a memory device 600, according to one or more examples, the memory device 600 includes memory controller circuitry 602, memory cells 610, bitlines 618, and wordlines 620. The memory controller circuitry 602 includes selection circuitry 612, driver circuitry 614, and control circuitry 616. In one example, the memory device 600 is disposed within an IC chip. In such an example, the gate circuitry and capacitors of each memory cell 610 are formed within the BEOL of the IC chip.

Each of the memory cells 610 is configured similar to the memory cell 500 of FIG. 5A or the memory cell 550 of FIG. 5B. For example, each of the memory cells 610 includes gate circuitry (e.g., the transistor 512 of FIG. 5A or the transistor 552 of FIG. 5B), and two or more capacitors (e.g., the capacitors 514 of FIG. 5A or the capacitors 554) connected to the two or more drive lines 622 and 624.

Each memory cell 610 is connected to a respective bitline or bitlines 618, a respective wordline 620, and the drive lines 622 and 624. In one example, each memory cell 610 is connected to multiple bitlines 618 (e.g., two or more bitlines 618). While two drive lines 622 and 624 are illustrated, in other examples, more than two drive lines may be included within the memory device 600. In one example, the number of drive lines corresponds to the number of groups of capacitors within the memory cells 610 or the number of capacitors within the memory cells 610. With reference to FIG. 5A, the drive line 622 is connected to the $V_{base\_1}$ node and the drive line 624 is connected to the $V_{base\_T/P}$ node. With reference to FIG. 5B, the drive line 622 is connected to the $V_{base\_0}$ node and the drive line 624 is connected to the $V_{base\_1}$ node, and additional drive lines are connected to respective ones of the $V_{base\_Z-1}$ to $V_{base\_Z}$ nodes.

The control circuitry 616 drives a voltage or electrically floats the drive lines 622 and 624 to drive the corresponding $V_{base}$ nodes and/or electrically floats the corresponding $V_{base}$ nodes. In one example, the control circuitry 616 drives the drive line 622 and 624 connected the $V_{base}$ node that is connected to the capacitor or capacitors that is to be read from or updated. The control circuitry 616 electrically floats or drives with a biasing voltage the drive lines 622 and 624 connected to the $V_{base}$ node or nodes that are not to be read from or updated.

The selection circuitry 612 drives one of the wordlines 620 to select a row of memory cells 610 for updating. In on example, the selection circuitry 612 receives an address control signal, determines a row of memory cells 610 to select for updating based on the address within the memory address signal, and drives the corresponding wordline 620 to select the row of memory cells 610 that includes the memory cell 610 associated with the address. In one example, driving a wordline 620 includes asserting the wordline. Further, driving the wordline 620 includes driving a wordline 620 to a logic value of 0 or a logic value 1 to assert the wordline 620.

The driver circuitry 614 selects the bitline 618 or bitlines 618 associated with a memory cell 610 selected for updating. In one example, the driver circuitry 614 drives a voltage onto a bitline 618 or bitlines 618 associated with the selected memory cell 610 to update the selected memory cell 610. In another example, the driver circuitry 614 electrically floats a bitline 618 or bitlines 618 associated with the selected memory cell 610 to read a corresponding voltage. The driver circuitry 614 receives an address control signal, determines a column associated with the selected memory cell 610 from the address control signal, and updates the selected memory cell 610 or reads a voltage from the selected memory cell 610 via a respective bitline 618 or bitlines 618. The driver circuitry 614 includes write circuitry, sense amplifiers, and/or multiplexers that function to select and update or read from the selected memory cell 610.

Figure 7:
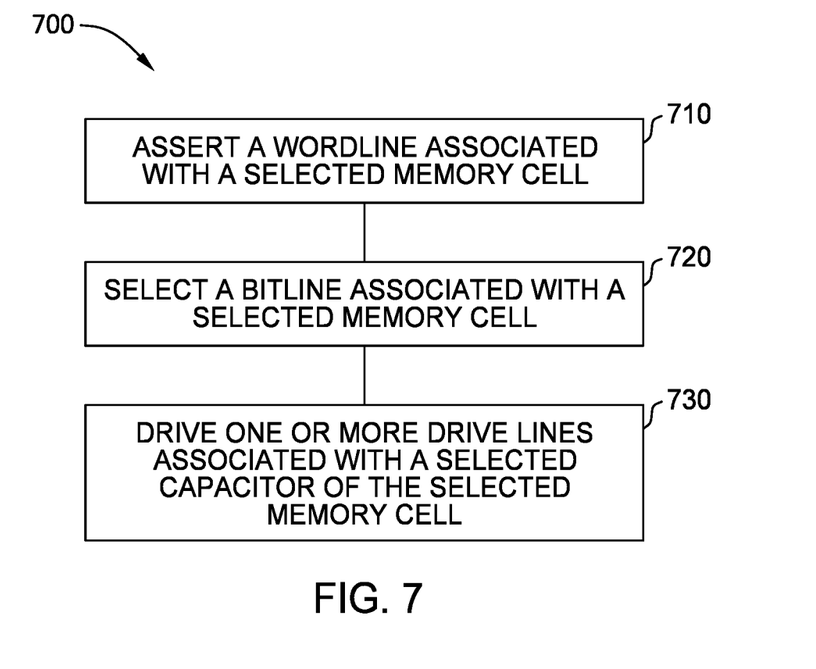
FIG. 7 illustrates a flowchart of a method for updating a memory cell.

FIG. 7 illustrates a flowchart of a method 700 for reading from or updating a selected memory cell, according to one or more examples. At 710 of the method 700, a wordline associated with a selected memory cell is asserted. For example, with reference to FIG. 6, the selection circuitry 612 receives an address control signal and selects a row of memory cells having the selected memory cell 610 by asserting the corresponding wordline 620. Asserting the wordline 620 includes driving the wordline to a logic value of 0 or 1.

At 720 of the method 700, a bitline associated with the selected memory cell is selected. In one example, the driver circuitry 614 of FIG. 6 receives the address control signal and selects a bitline 618 connected to the column of memory cells having the selected memory cell 610 to be driven with a voltage signal for a write command or to be read from for a read command. When performing a read command, the selected bitline is electrically floated. In one example, the driver circuitry 614 connects the bitline 618 to driver circuitry to drive a voltage or a sense amplifier to read a voltage via an internal multiplexer.

At 730 of the method 700, one or more drive lines associated with a selected capacitor of the selected memory cell are driven. Driving the drive lines allows for a read operation or a write operation to occur. In one example, driving the drive lines is performed by control circuitry (e.g., the control circuitry 616 of FIG. 6). The control circuitry 616 determines which drive line 622 or 624 to drive with a voltage signal (e.g., a logic value of 0 or 1) and which drive line 622 or 624 to electrically float to update the selected capacitor. In one example, the control circuitry 616 receives an address control signal and determines which capacitor that is selected for updating or to be read from. The control circuitry 616 drives the drive line 622 or 624 connected to the capacitor that is selected with a voltage signal (e.g., a logic value of 0 or 1), and electrically floats the remaining drive lines.

In one example, a read operation (e.g., a read memory operation) is a destructive read. For example, in a ferroelectric based memory device (e.g., a memory device that includes ferroelectric capacitors) a read operation is a destructive read. The capacitors 514 of FIG. 5A and the capacitors 554 of FIG. 5B are formed from ferroelectric materials. Accordingly, a read operation applied to the capacitors 514 of FIG. 5A and/or a read operation applied to the capacitors 554 of FIG. 5B is a destructive read operation. Accordingly, a write back step (or write back drive period) following a read operation is performed. In one example, the write back operation occurs after "S" read operations are performed. S is two or more. In one example, S is equal to the number of capacitors or capacitor groups within a memory cell. As the write back operation decreases the performance of the memory system, decreasing the number of write back operations increases the performance of the memory device. For example, decreasing the number of write back operations, decreases the amount of time between read or write operations that may be performed, increasing the performance of the memory device. For a memory cell having multiple capacitors, two or more of the capacitors may be used to store duplicate information. In such an example, when a read operation is performed on a first capacitor memory cell, a following read operation to the same memory cell may access another capacitor with the memory cell having duplicate information. Accordingly, a write back operation occurs after each capacitor of a memory cell is read from or after a predetermined number of reads is performed (the number of reads may be less than or equal to the number of capacitors in the memory cell). With reference to FIG. 5A, the capacitors 504$_0$ and 504$_1$ and the capacitors 504$_{T-1}$ and 504$_T$ are loaded with duplicate values. Accordingly, a read operation may be applied to each of the groups of capacitors 504$_0$ and 504$_1$ and 504$_{T-1}$ and 504$_T$ before a write back operation is performed. With reference to FIG. 5B, each of the capacitors 554$_0$-554$_M$ may be loaded with duplicate values. In such an example, a write back operation occurs after each of the capacitors 554$_0$-554$_M$ is read from. In an example where multiple capacitors are loaded with the same value (e.g., duplicate value), the corresponding drive lines are driven the same to allow the capacitors to be updated at the same time. In another example, one or more capacitors are updated at a time. In one example, a write operation or a write back operation may be applied to each of the capacitors of a memory cell.

The amount of replication of the data may be application specific or determined based on workload statistics of number of reads for every write, or memory performance parameters, to increase the performance and mitigate effects of power overhead. The control circuitry 616 determines the amount of replicated data based on parameters of the corresponding memory device (e.g., workload statistics and/or performance parameters, among others). Writing the replicated (e.g., duplicate) data in the ferroelectric capacitors may utilize additional power, but while reading, only one set of data is read out. While the read operation destroy a single set of data, write back may not be used for each read since duplicates of the data are available within the memory cell. This can be achieved in circuit design by selecting the appropriate bitline/wordline (BL/WL) voltage, along with the specific drive lines to read out from specific capacitors of a memory cell. For example with reference to FIG. 5B, during a first read operation, to read from the capacitor 554$_0$, the drive line associated with the Vbase_0 node is driven, and during subsequent read operations the drive lines associated with the Vbase node to read from the subsequent capacitors 554$_1$-554$_M$ of the memory cell 560.

The control circuitry 616 maintains the number of read operations performed on each memory cell (e.g., the memory cell 610 of FIG. 6). When the number of read operations is equal to the number of capacitors or groups of capacitors within a memory cell storing replicated data, or equal to a threshold number of reads a write back operation is performed to the memory cell.

In one or more examples, the replicated capacitors may be written in the background while the other steps of the memory write process is completed, reducing the amount of power used when performing a write back operation. In one example, writing replicated data to a memory cell in the background mitigates the increase in power used to write replicated data to each of the capacitors of a memory cell.

In one or more examples, the data stored in the duplicate, or additional, capacitors may be used for error correction and recovery. For example, based on the detection of an un-correctable error detected at read, data (a data copy) within one of the duplicate capacitors as illustrated in FIGS. 5A and 5B is accessed and read without error correction/recovery/data corruption. In one example, the control circuitry 616 or other circuitry within the memory device 600 determines that an error has occurred within a capacitor and selects another capacitor to be read from or to be written to for updating.

In one or more examples, the storage capacitors are utilized to form discretized ferroelectric storage capacitors in a ferroelectric based memory for multi-bit storage in a single bitcell. The memory density for a ferroelectric based memory can be further increased in the 1T-NC structure by taking advantage of the discrete capacitors to store multiple bits, forming a multi-bit cell. For example, in FIG. 5B, "B" bits may be stored within the M capacitors 554. The capacitors can also be separated by an air-gap or dielectric having a low dielectric constant (K) to reduce coupling between leakage within bitcells and between neighboring bitcells. Multiple discrete increments in the read current pulse are generated to indicate multiple bits versus logic 0/1. For example, voltages between the voltages used to create logic 0 and logic 1 are generated, creating additional bits between logic 0 and logic 1. In one example, the data from each capacitor may be read out independently, by asserting the drive lines (e.g., the drive lines 622 or 624 of FIG. 6) to create the electric potential across a selected capacitor or capacitors to read the data as needed.

In one or more examples, write back is performed only for the bits that were accessed/updated. In such examples, the capacitor ground plate potential of the read capacitors (e.g., capacitors having destroyed data) is driven. Accordingly, the lifetime of the ferroelectric based memory bitcells may be increased. Typically, for a read, the bitline is electrically floating, and drive line, $V_{base}$ node, is asserted. To write data to a capacitor (e.g., a selected capacitor) of a bitcell, the bitcell is enabled by driving the bitline to the corresponding voltage, and the base plate (e.g., $V_{base}$ node) of the remaining unselected capacitors (e.g., drive line or driver plate) to the bitline value so that no electric field is formed across the unselected capacitors. An electric field is only applied across the capacitor or capacitors that are to be written to, and the remaining capacitors are not affected. Accordingly, the lifetime of the memory cell is further extended.

While the foregoing is directed to specific examples, other and further examples may be devised without departing from the basic scope thereof, and the scope thereof is determined by the claims that follow.

What is claimed is:

1. A memory cell comprising:
gate circuitry connected to a wordline and a bitline;
a first capacitor connected to the gate circuitry and a first drive line; and
a second capacitor connected to the gate circuitry and a second drive line, wherein the first capacitor and the second capacitor are configured to be connected to a memory controller, the memory controller configured to:
write a first value to the first capacitor and the second capacitor by selecting the wordline, the bitline, and driving a first voltage onto the first drive line and the second drive line; and
read the first value from the second capacitor based on detecting an error in the first capacitor.

2. The memory cell of claim 1, wherein the gate circuitry comprising a transistor having a gate node connected to the wordline and a second node connected to the bitline.

3. The memory cell of claim 2, wherein the transistor, the first capacitor and the second capacitor are formed within a back end of line portion of an integrated circuit chip.

4. The memory cell of claim 1 further comprising:
a third capacitor connected to the gate circuitry and a third drive line.

5. The memory cell of claim 1, wherein the first capacitor and the second capacitor are configured to store replicated data.

6. The memory cell of claim 1, wherein the first capacitor is configured to store a first bit of a plurality of bits, and the second capacitor is configured to store a second bit of the plurality of bits.

7. The memory cell of claim 1, wherein at least one of the first capacitor and the second capacitor is a ferroelectric capacitor.

8. A memory device comprising:
a plurality of wordlines;
a plurality of bitlines;
a plurality of drive lines; and
a plurality of memory cells, a first memory cell of the plurality of memory cells comprises:
gate circuitry connected to a first wordline of the wordlines and a first bitline of the bitlines;
a first capacitor connected to the gate circuitry and a first drive line of the plurality of drive lines; and
a second capacitor connected to the gate circuitry and a second drive line of the plurality of drive lines; and
memory controller circuitry coupled to the plurality of wordlines, the plurality of bitlines, and the plurality of drive lines, the memory controller circuitry is configured to:
write a first value to the first capacitor and the second capacitor by selecting the first wordline, the first bitline, and driving a first voltage onto the first drive line and the second drive line; and
read the first value from the second capacitor based on detecting an error in the first capacitor.

9. The memory device of claim 8, wherein the gate circuitry comprising a transistor having a gate node connected to the first wordline and a second node connected to the first bitline.

10. The memory cell of claim 1, wherein the memory controller is further configured to:
perform a first read operation on the first capacitor and a second read operation on the second capacitor to read a second value from the first capacitor and the second capacitor; and
perform a write back operation to write the second value to the first capacitor and the second capacitor based on performing the first read operation and the second read operation.

11. The memory device of claim 8, wherein the first memory cell further comprises a third capacitor connected the gate circuitry and a third drive line of the plurality of drive lines, and wherein the memory controller circuitry is configured drive a biasing voltage onto the third drive line or electrically float the third drive line.

12. The memory device of claim 8, wherein the memory controller circuitry is further configured to:
write a second value to the first capacitor by selecting the first wordline, the first bitline, and driving the first voltage onto the second drive line, the second value differs from the first value.

13. The memory device of claim 8, wherein the first memory cell further comprises a third capacitor, and wherein the memory controller circuitry is further configured to write replicated data onto two or more of the first capacitor, the second capacitor, and the third capacitor based on parameters of the memory device.

14. The memory device of claim 13, wherein writing the replicated data onto two or more of the first capacitor, the second capacitor, and the third capacitor occurs during a period that overlaps with the memory controller circuitry performing another memory operation.

15. The memory device of claim 8, wherein the memory controller circuitry is further configured to:
perform a first read operation on the first capacitor and a second read operation on the second capacitor to read a second value from the first capacitor and the second capacitor; and
perform a write back operation to write the first value to the first capacitor and the second capacitor based on performing the first read operation and the second read operation.

16. The memory device of claim 15, wherein the first read operation and the second read operation are destructive read operations.

17. A method comprising:
asserting a wordline associated with a selected memory cell, wherein the selected memory cell comprises:
gate circuitry connected to the wordline and a bitline;
a first capacitor connected to the gate circuitry and a first drive line; and
a second capacitor connected to the gate circuitry and a second drive line;
writing a first value to the first capacitor and the second capacitor by selecting the bitline, and driving a first voltage onto the first drive line and the second drive line; and
reading the first value from the second capacitor based on detecting an error in the first capacitor.

18. The method of claim 17 further comprising writing replicated data onto two or more of the first capacitor, the second capacitor, and a third capacitor of the selected memory cell during a period that overlaps with another memory operation being performed.

19. The method of claim 17 further comprising:
driving the first drive line, the second drive line, and the bitline to perform a read operation on the first capacitor and the second capacitor; and
writing a second value to the first capacitor and the second capacitor based on performing the read operation on the first capacitor and the second capacitor.

* * * * *